United States Patent [19]

Shaw

[11] 3,828,207

[45] Aug. 6, 1974

[54] BOOST CIRCUIT FOR SATURATING OUTPUT STAGES OF HIGH POWER AMPLIFIERS

[75] Inventor: Benjamin Chandler Shaw, Granada Hills, Calif.

[73] Assignee: The Bendix Corporation, North Hollywood, Calif.

[22] Filed: June 6, 1973

[21] Appl. No.: 367,676

[52] U.S. Cl. .................... 307/254, 307/296, 321/18, 328/14, 330/15, 330/22, 307/261

[51] Int. Cl. .......................................... H03k 17/60

[58] Field of Search ........... 307/253, 254, 296, 300, 307/261; 330/15, 26, 22; 331/113 A; 321/18; 328/14

[56] References Cited

UNITED STATES PATENTS

| | | | |
|---|---|---|---|
| 2,774,878 | 12/1956 | Jensen | 330/15 X |
| 2,950,446 | 8/1960 | Humez et al. | 331/113 A |
| 2,968,738 | 1/1961 | Pintell | 331/113 A |

*Primary Examiner*—John Zazworsky
*Attorney, Agent, or Firm*—Robert C. Smith; William F. Thornton

[57] ABSTRACT

A high power, high efficiency transistor amplifier is disclosed having an input drive signal in the form of a square wave with a square wave or saturated voltage output. This amplifier drives a tuned or reactive load with the result that the output current wave form is sinusoidal or some form other than a square wave. A current transformer or other current sensing device is connected into the output circuit, and a portion of the output current is fed back to the input in such sense that resulting sinusoidal voltage pulses are added to each square wave input pulse. Where the output transistors are connected in push-pull in a grounded emitter configuration, resistors are normally connected in the emitter circuit. A sinusoidal voltage is developed across these resistors which subtracts from the input drive square wave voltage pulses. This results in a degradation in the drive signal which may cause the output transistors to drop out of saturation which then causes them to try to deliver excessive power with resulting danger of burning them out. By feeding back a sinusoidal voltage which is added to the base drive, saturation is maintained throughout the length of the drive pulse. In another embodiment a plurality of identical amplifiers are connected into a common output such that their square wave voltage output signals are displaced slightly in time and algebraically added to produce a sine wave synthesis output signal across the load which, in this case, may be either reactive or resistive. A similar current sensing or voltage sensing device connected into the load circuit provides a similar feedback signal to each amplifier to assure saturation.

5 Claims, 10 Drawing Figures

PATENTED AUG 6 1974 3,828,207

SHEET 1 OF 2

BOOST CIRCUIT FOR SATURATING OUTPUT STAGES OF HIGH POWER AMPLIFIERS

BACKGROUND OF THE INVENTION

In dealing with high efficiency, high power amplifiers having transistor output stages, applicant has experienced some special problems where the input signals are square wave voltages as from a digital logic circuit and the output circuits drive into highly reactive load devices. Normally the output stages have been arranged in inverse-parallel or push-pull and, in some applications, there have been a plurality of such push-pull output stages feeding into a common output to produce a sine synthesis output. The difficulty experienced was frequent destruction of numbers of power transistors, apparently from overloading. In cases where the reactive load devices are in the form of piezoelectric transducers, some problems, but not all, could be attributed to a tendency of the transducers to develop short circuits in operation.

To assure current sharing between the transistors where parallel transistors are used, it is customary to install separate emitter resistors in each paralleled transistor. If this is not done, the transistor of the pair having the higher beta will attempt to carry all of the collector current and may thereby be destroyed.

Even with the emitter resistors, the problem of power transistor loss remained. One solution which has been common in other types of drive circuits and which has been used in this type of application involves the use of a resistor in series with the base drive which tends to hold a substantially constant base current despite variations of the emitter voltage due to resistance in the emitter circuit. This solution involves a serious penalty in power dissipation leading to quite low efficiencies. It is not uncommon in practice for 80 percent or more of the base driving power to be dissipated in this fashion.

SUMMARY OF THE INVENTION

In high efficiency power amplifiers wherein high power transistor output stages are driven into tuned or reactive load circuits, the wave form of the output current is not, in general, the same as that of the voltage. Frequently the stage is driven into saturation such that the output voltage appears as a square wave, although the output or collector current may retain a sine wave form. In much modern circuitry the driving voltage is a square wave derived from logic (digital) elements and subsequent amplifying stages may also operate as logic circuits with square wave voltage output characteristics. The square wave is necessary to insure initial saturation and termination of the collector wave, whereas the current sine wave is related to the fact that the base current required to maintain the output transistor in saturation is a function of the collector current flowing in the transistor. If output transistor beta were a constant, the input base current wave form and the output wave form would be directly related. In reality the beta in high power devices normally decreases with increasing collector current, hence requiring an even greater increase in the base current than the increase in collector current during the saturated phase. If this greater increase is not forthcoming, the transistor may drop out of saturation, causing it to attempt to dissipate excessive power.

Where parallel transistors are used with emitter resistors to drive a reactive load from a square wave input, as set forth above, and where the collector current is not the same wave form as the saturated output voltage (for example, a sine wave of current in a square wave voltage condition), the voltage developed across the emitter-resistor will likewise be half sinusoidal in form. This voltage subtracts from the base drive voltage and results in reducing the effective base drive voltage (hence, base driving current) at the point of maximum collector current which is the point at which the maximum base drive current is required to pass the output current. The result is that the effective base current is a maximum at the points of zero collector current and a minimum at the center of the cycle, the point of maximum collector current. Thus the danger is presented that the output transistors will drop out of saturation, thus creating a demand for excessive power with danger of destroying the transistors.

With the base drive problem identified as set forth above, it appeared necessary to augment the base drive voltage in some manner, and it was determined that by using an output current sampling device such as a current transformer and feeding each half cycle back to the input base circuit in the positive direction, the separate half sine wave currents generate voltages to modulate, or add to, the base drive voltage. By superimposing a half sine wave voltage characteristic on the base drive voltage, the voltage lost across the emitter resistor is effectively compensated for and the base drive is maintained at a level which assures that the output transistors remain in saturation. If the output current has some arbitrary wave form, other than a sine wave, the same principle holds true in that the negative excursions are inverted to be a positive boost, since they represent a positive current to the opposite side of the push-pull output stage.

While the above description of an application to a simple square wave circuit holds only for reactive or tuned loads and not to resistive loads, it is applicable to both tuned and resistive loads in the case of sine synthesis output stages. Thus where a plurality of square wave circuits are connected to a common output to simulate a sine wave output, this output voltage can be sampled by a transformer, half-wave rectified, and the half wave rectifiers and transformer secondary effectively convert the output voltage wave to the required half sine wave boost for the base drive voltage as described above.

DESCRIPTION OF THE PREFERRED EMBODIMENT

Figure 1:
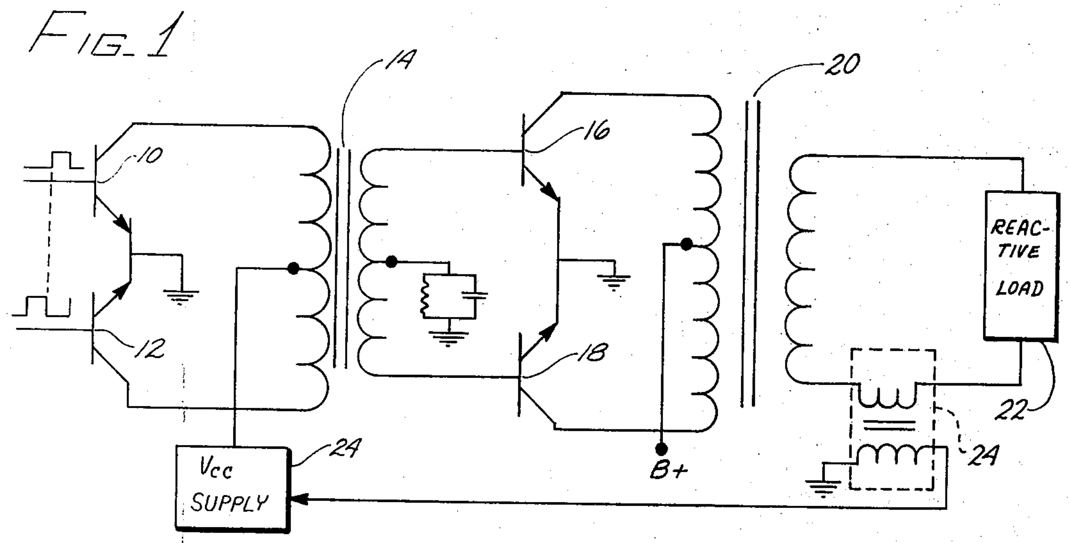
FIG. 1 is a schematic drawing of a typical transformer-coupled power amplifier for driving a reactive load including feedback means according to my invention.

Referring now to FIG. 1, it will be observed that square wave input voltage pulses displaced in time are supplied to the base circuits of each of transistors 10 and 12 which are connected via their collector circuits to an interstage transformer 14. Similar amplified square wave pulses are supplied to transistors 16 and 18 of an output stage which are connected through their collector circuits to an output transformer 20. Transformer 20 is connected to drive a tuned or reactive load 22 which may be a device such as a piezoelectric transducer. A current transformer 24 is connected in the output circuit between output transformer 20 and load 22 in such manner that its secondary winding supplies a portion of the output current back to the collector voltage supply 24 for transistors 10 and 12. This collector voltage supply is connected to a center tap on the primary winding of interstage transformer 14.

Figure 2A:
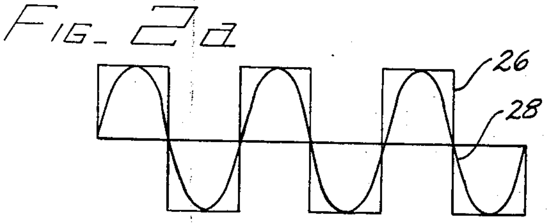
FIG. 2*a* shows voltage and current wave forms such as might be experienced with the amplifier of FIG. 1.
Figure 2B:
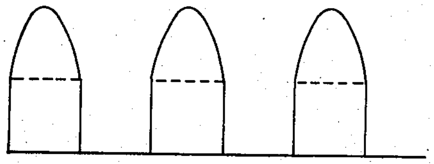
FIG. 2*b* is a wave form showing the manner in which the current fed back to the base circuits increases the base drive voltage.

In FIG. 2*a* are drawn graphs showing the voltage and current wave forms of the output supplied from transformer 20. The individual square wave voltage pulses amplified on each side of the push-pull system are combined in the output winding of transformer 20 to form a square wave voltage pattern such as that shown in FIG. 2*a* at 26. Because of the nature of a highly reactive load 22, as discussed above, the current wave form tends to be sinusoidal as shown at numeral 28. By connecting a current transformer, such as transformer 24 in the output circuit, a portion of this sinusoidal current wave form is supplied to each side of the inverse parallel system such that it adds to or augments the input voltage pulses supplied to the bases of transistors 16 and 18. FIG. 2*b* shows the manner in which the sinusoidal voltages resulting from this sinusoidal current input to the collector supply 24 are added to the square wave input pulses.

Figure 3:
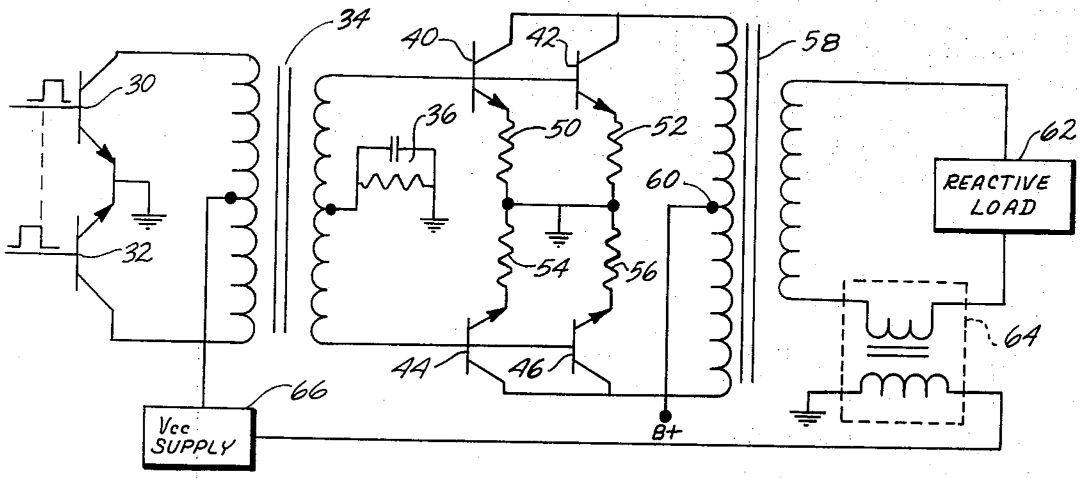
FIG. 3 is a schematic view of a power amplifier similar to that of FIG. 1 but including emitter resistors.

FIG. 3 shows a power amplifier similar to that shown in FIG. 1 but including power transformers arranged in push-pull parallel and with the emitters of such transistors connected to ground through emitter resistors. Again, out-of-phase pulse input voltages are supplied to the base circuits of transistors 30 and 32 which are connected through their collector circuits to the center tapped primary winding of an interstage transformer 34. The secondary winding of transformer 34 is also center-tapped, and connected to this center tap is a filter circuit 36 which is conventional and which operates to remove extraneous transients and high frequency noise from the input signal supplied to the base circuits of the power transistors 40, 42, 44 and 46. It will be observed that each of these transistors has its emitter circuit connected to ground through an emitter resistor 50, 52, 54, and 56, respectively. Paralleled transistors 40 and 42 are connected into the upper half of output transformer 58, and transistors 44 and 46 drive, on the opposite half cycle, into the bottom half of the primary winding of transformer 58. The center tap 60 of this primary winding is connected to a B+ voltage supply as shown. The secondary winding of transformer 58 is connected to a reactive load device 62, and a current transformer 64 is connected in the output circut for the purpose of feeding a portion of the output current back to the collector voltage supply for the transistors 30 and 32.

Figure 4A:
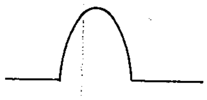
FIG. 4*a* is a graph showing the half sine wave of output current which is fed back to the input base drive circuit.
Figure 4B:
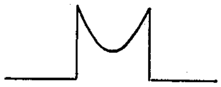
FIG. 4*b* is a graph showing the manner in which the input base drive voltage is degraded by the voltage developed across the emitter resistors.
Figure 4C:
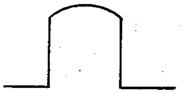
FIG. 4*c* is a graph showing the composite base drive voltage resulting when the voltage produced from the current pattern of FIG. 4*a* is added to the base drive voltage of FIG. 4*b*.

The effect of the feedback arrangement described above is shown graphically in FIGS. 4*a*, 4*b* and 4*c*. FIG. 4a shows a half sine wave which is exemplary of a half wave current signal sensed by the current transformer 64 and fed back in a given half cycle to the supply 66. The wave form of FIG. 4*b* is descriptive of the effective base to emitter voltage pattern resulting from use of the emitter resistors as described above in the absence of feedback. As voltage develops across the emitter resistors in essentially sinusoidal form, this sinusoidal voltage is effectively subtracted from what otherwise would be a square wave input to the base circuits of the output transistors. Thus it will be seen that this base drive voltage is substantially degraded at mid-cycle, which is right at the point where it most needs to be maintained because of the normal decrease in transistor beta which occurs with increasing collector current. In the absence of the feedback from current transformer 64 through the collector supply 66, the wave form 4*b* can result in permitting some of the output transistors 40, 42, 44 and 46 to drop out of saturation, tending to cause them to draw excessive power with corresponding danger of being destroyed. The result of feeding the current wave of FIG. 4*a* back to the voltage supply 66 is to cause augmentation of the voltage which results in an input voltage drive such as that shown in FIG. 4*c* and which overcomes the degradation of FIG. 4*b* and maintains the voltage drive at a level sufficient to assure saturation.

Figure 5:
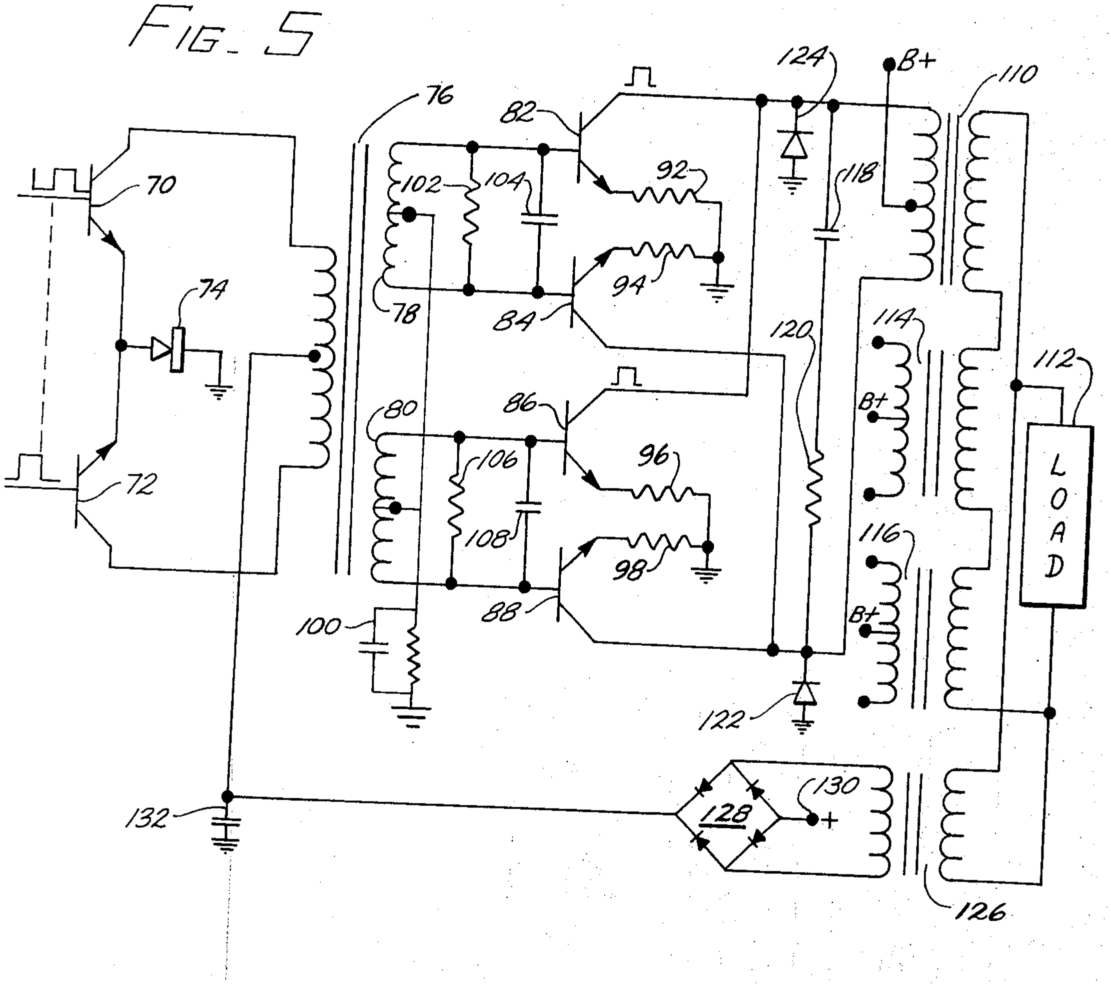
FIG. 5 is a schematic drawing of a power amplifier similar to that of FIG. 3 but including a plurality of output sections to effect a sine synthesis output pattern.

FIG. 5 shows a power amplifier arrangement similar to that shown in FIG. 3 but includes a plurality of similar square wave amplifiers whose outputs are combined to produce a voltage synthesis circuit, and each amplifier circuit has a push-pull parallel output. Square wave input pulses are supplied to the base circuits of a pair of input transistors 70 and 72 which have their emitters connected to ground through a diode 74 and their collectors connected to opposite ends of the primary winding of a center-tapped interstage transformer 76. Diode 74 serves as a biasing diode for transistors 70 and 72 which keeps their emitter circuits somewhat above ground to aid in insuring that they will positively turn off when driven from the type of logic input signal shown. Transformer 76 has a pair of secondary windings 78 and 80 with the upper end of winding 78 connected to the base circuit of a power transistor 82, and the lower end of this winding being connected to the base circuit of a power transistor 84; the upper end of secondary winding 80 being connected to the base circuit of power transistor 86 and the lower end thereof being connected to a power transistor 88. These transistors have their emitter circuits connected to ground through emitter resistors 92, 94, 96 and 98, respectively. Each of secondary windings 78 and 80 has a center tap which is connected to ground through a circuit 100 whose function is to bias the center tap above ground level. Connected across secondary winding 80 in a similar manner are a resistor 106 and a capacitor 108. These components operate in a conventional manner to suppress transient signals as is well understood in the art. Transistors 82 and 86 operate in parallel to provide a positive square wave pulse to the upper end of the primary winding of an output transformer 110. In the next half cycle a square wave pulse is supplied from the collector circuits of transistors 84 and 88 to the lower half of the primary winding of transformer 110. A "B plus" supply is connected to the center tap of this primary winding. The secondary winding of transformer 110 is connected to a load device 112 which may be either resistive or reactive and also through secondary windings of additional output transformers 114 and 116. Transformers 114 and 116 are output transformers of amplifiers identical to that described above for driving transformer 110 with the exception that their outputs are supplied in a slightly different phase relationship, as will be discussed below.

Connected across the primary winding of transformer 110 is a filter circuit consisting of a capacitor 118 and a resistor 120 which is connected to ground through a diode 122. A similar diode 124 connects the collector circuit of transistor 82 to ground. Capacitor 118 and resistor 120 form a conventional filtering circuit to remove undesirable transients. Diodes 122 and 124 serve as damper diodes to provide a current path for reverse currents which flow where the phase of the load current is not in phase with the driving voltage wave form.

Figure 6A:
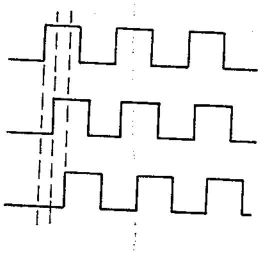
FIG. 6*a* is a graph showing the output patterns of the output sections of the amplifier of FIG. 5.

The organization of FIG. 5 operates to synthesize a sinusoidal wave form of output voltage through the technique of algebraically adding the outputs of three amplifiers essentially the same as that shown in FIG. 5. The output wave forms are shown in FIG. 6*a*, and it will be seen that they are identical except for being separated by approximately 60 electrical degrees. Since the secondary windings of output transformers 110, 114 and 116 are connected in series, these signals are added algebraically to produce an output voltage pattern across the load 112 which looks like the wave form 6*b*.

Figure 6B:
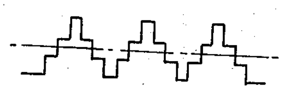
FIG. 6*b* is a graph of the composite voltage form resulting from combining the output voltages of FIG. 6*a*.

Also connected in the output circuit is a current transformer 126 which taps off a portion of this load current and feeds it back to opposite terminals of a diode bridge rectifier 128. Bridge 128 is connected between a positive direct current source 130 and ground through a capacitor 132. This organization provides separate half-wave voltage pulses to each of the separate amplifiers, each having a wave form essentially like that of FIG. 6*b*. These feedback pulses are connected to the center tap of the primary winding of interstage transformer 76 where they are added to the base drive signals supplied to the output transistors 82, 84, 86 and 88. Again, this signal being roughly sinusoidal in form will compensate for the voltage loss through the emitter resistors 92, 94, 96 and 98, thereby assuring that the transistors remain in saturated condition through their respective half cycles.

While the above embodiments have been described in terms of outputs having a square wave voltage output and a sinusoidal or other form of output current wave, which normally results from driving into a reactive load, the teachings herein are useful whenever an essentially square wave voltage input is used to drive a transistorized power amplifier having output current wave forms substantially different from the input voltage wave form. Thus while current sampling means are described for sensing the feedback signal, voltage sampling means would obviously perform the same function where the wave forms are similar, as where a sine synthesis wave form is produced.

I claim:

1. A high power, high efficiency amplifier having output transistors arranged in push-pull and having their collectors connected to supply power to a load, with resistors connected between the emitters of said transistors and ground, and each of said transistors being biased to saturation during its conductive half cycle, base drive means for supplying input signals to said transistors having a square wave voltage characteristic, current sampling means connected between said output transistors and said load device for sensing output current to said load, and means responsive to said current sampling means for supplying a voltage resulting from said sensed current to said base drive means in such sense as to add to said base drive voltage.

2. An amplifier as set forth in claim 1 wherein said amplifier includes an output transformer having a primary winding connected to said collectors, and said current sampling means is connected between said output transformer and said load.

3. An amplifier as set forth in claim 1 including a plurality of output transformers having their secondary windings connected in series across said load, a plurality of separate amplifier circuits connected to the primary windings of said output transformers, said amplifier circuits having their outputs displaced in time such that the voltage across said load is added algebrically to form a sine synthesis output waveform.

4. An amplifier as set forth in claim 1 wherein at least four of said output transistors are arranged in push-pull, parallel and resistors are connected between the emitters of each of said output transistors and ground.

5. An amplifier as set forth in claim 4 wherein said amplifier includes an output transformer having a primary winding connected to said collectors, and said current sampling means is connected between said output transformer and said load.

* * * * *